United States Patent
Sun et al.

(10) Patent No.: US 11,973,705 B2
(45) Date of Patent: Apr. 30, 2024

(54) IMPROVING NETWORK MULTIPLE-INPUT, MULTIPLE-OUTPUT (MIMO) PERFORMANCE WITH HIGH DOPPLER SHIFT

(71) Applicant: Apple Inc., Cupertino, CA (US)

(72) Inventors: Haitong Sun, Irvine, CA (US); Chunhai Yao, Beijing (CN); Chunxuan Ye, San Diego, CA (US); Dawei Zhang, Saratoga, CA (US); Hong He, Cupertino, CA (US); Huaning Niu, San Jose, CA (US); Jie Cui, San Jose, CA (US); Oghenekome Oteri, San Diego, CA (US); Wei Zeng, San Diego, CA (US); Weidong Yang, San Diego, CA (US); Yang Tang, Cupertino, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 309 days.

(21) Appl. No.: 17/437,738

(22) PCT Filed: Oct. 2, 2020

(86) PCT No.: PCT/CN2020/119786
§ 371 (c)(1),
(2) Date: Sep. 9, 2021

(87) PCT Pub. No.: WO2022/067852
PCT Pub. Date: Apr. 7, 2022

(65) Prior Publication Data
US 2022/0321289 A1   Oct. 6, 2022

(51) Int. Cl.
*H04L 5/00* (2006.01)
*H04B 7/024* (2017.01)
(Continued)

(52) U.S. Cl.
CPC .......... *H04L 5/0035* (2013.01); *H04B 7/024* (2013.01); *H04L 5/0051* (2013.01);
(Continued)

(58) Field of Classification Search
CPC ... H04L 5/0035; H04L 5/0051; H04L 5/0053; H04L 5/0094; H04W 52/242;
(Continued)

(56) References Cited

U.S. PATENT DOCUMENTS 10,701,679 B2   6/2020   Vilaipornsawai et al.
2018/0213595 A1*  7/2018  Lee .................... H01Q 1/3216
(Continued)

FOREIGN PATENT DOCUMENTS

CN   111727586 A    9/2020
EP   3567967 A1    11/2019
(Continued)

OTHER PUBLICATIONS

Extended European Search Report for EP Patent Application No. 20955872.5; dated Sep. 26, 2023.
(Continued)

*Primary Examiner* — Rasheed Gidado
(74) *Attorney, Agent, or Firm* — Kowert, Hood, Munyon, Rankin & Goetzel, P.C.

(57) ABSTRACT

This disclosure relates to techniques for performing wireless communications by a network in communication with a UE that is moving rapidly. The network may adapt communication techniques in response to the UEs motion. For example, reference signals may be transmitted to the UE from additional transmission and reception points and/or using different configurations.

21 Claims, 9 Drawing Sheets

(51) Int. Cl.
*H04W 52/14* (2009.01)
*H04W 52/24* (2009.01)
*H04W 72/04* (2023.01)
*H04W 72/23* (2023.01)

(52) U.S. Cl.
CPC ......... *H04L 5/0053* (2013.01); *H04W 52/146* (2013.01); *H04W 52/242* (2013.01); *H04W 72/23* (2023.01)

(58) Field of Classification Search
CPC . H04W 52/146; H04W 72/042; H04W 72/23; H04W 72/1273; H04W 36/324; H04W 36/185; H04W 36/28; H04W 36/242; H04B 7/024; H04B 7/022; H04B 7/026; H04B 7/0697
See application file for complete search history.

(56) References Cited

U.S. PATENT DOCUMENTS

| | | | | |
|---|---|---|---|---|
| 2018/0316409 | A1* | 11/2018 | Yoon | .................. H04L 5/0044 |
| 2019/0261234 | A1* | 8/2019 | Park | .................. H04W 36/08 |
| 2020/0053777 | A1 | 2/2020 | Babaei et al. | |
| 2020/0128467 | A1 | 4/2020 | Gao | |
| 2020/0267750 | A1 | 8/2020 | Park et al. | |
| 2020/0274656 | A1 | 8/2020 | Gordaychik | |
| 2021/0212023 | A1* | 7/2021 | Zeng | .................. H04W 72/121 |
| 2022/0217742 | A1* | 7/2022 | Kim | .................. H04L 5/0094 |

FOREIGN PATENT DOCUMENTS

| | | |
|---|---|---|
| WO | 2020092498 | 5/2020 |
| WO | 2020164014 A1 | 8/2020 |

OTHER PUBLICATIONS

Lenovo et al. "Enhancements for HST-SFN deployment"; 3GPP TSG RAN WG1 #102e R1-2005925; Aug. 17, 2020.

Apple Inc "On Further MIMO Enhancement"; 3GPP TSG RAN WG1 #100b R1-2004234; May 25, 2020.

International Search Report for PCT Patent Application No. PCT/CN2020/119786; dated Jul. 2, 2021.

Nokia et al. "Enhancements for HST-SFN deployment"; 3GPP TSG RAN WG1 #102-e Meeting R1-2006847; Aug. 28, 2020.

* cited by examiner

| FIG. 9 | FIG. 10 |
|---|---|
| CDM Group 0 | CDM Group 0 |
| CDM Group 1 | CDM Group 0 |
| CDM Group 0 | CDM Group 1 |
| CDM Group 1 | CDM Group 1 |
| CDM Group 0 | CDM Group 2 |
| CDM Group 1 | CDM Group 2 |
| CDM Group 0 | CDM Group 0 |
| CDM Group 1 | CDM Group 0 |
| CDM Group 0 | CDM Group 1 |
| CDM Group 1 | CDM Group 1 |
| CDM Group 0 | CDM Group 2 |
| CDM Group 1 | CDM Group 2 |

| Serving Cell ID | | CORESET ID | |
|---|---|---|---|
| CORESET ID | TCI State ID 1 | | |
| TCI State ID 2 | | | R |

*FIG. 16* ions, including to adapting communication procedures of base stations and network elements in a wireless communication system for a user equipment device moving rapidly.

IMPROVING NETWORK MULTIPLE-INPUT, MULTIPLE-OUTPUT (MIMO) PERFORMANCE WITH HIGH DOPPLER SHIFT

TECHNICAL FIELD

The present application relates to wireless communication, including to adapting communication procedures of base stations and network elements in a wireless communication system for a user equipment device moving rapidly.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics. In general, it would be desirable to recognize and provide improved support for a broad range of desired wireless communication characteristics. One characteristic may be rapid motion of an electronic device, e.g., on a high speed train or other form of fast transportation. Therefore, improvements in the Field are desired.

SUMMARY

Embodiments are presented herein of, inter alia, systems, apparatuses, and methods for performing radio resource control connection procedures for rapidly moving wireless devices in a wireless communication system.

As noted above, the number of use cases for wireless networks communicating with different classes of user equipment devices (UEs) with widely variable capabilities and usage expectations are growing. One direction in expansion of possible use cases supported by wireless communication techniques may include increasing use of wireless networks by UEs that are traveling rapidly. Wireless communication may be impacted by rapid motion including by different channel characteristics observed by different transmission and reception points (TRPs), e.g., along a route of a fast moving UE. For example, a UE moving along a high-speed train route may experience/exhibit different characteristics relative to TRPs ahead of and behind the UE.

Accordingly, the techniques described herein include techniques for a network (in communication with a rapidly moving UE) to adapt communication techniques to such rapid motion. For example, a network may schedule reference signals from multiple TRPs for use by the UE to demodulate data and/or control signals from the TRPs. In another example, a network may use more flexible signaling to update reference signal configurations. In another example, spatial relationship and/or quasi-colocation concepts and procedures may be adapted to support rapidly moving UEs. Different transmission configurations may be used by different TRPs, and the transmission configurations may be signaled flexibly.

Further, a definition of a spatial relation may be extended to include frequency offset. The network may configure the UE to transmit reference signals based on the spatial relationship and/or based on an absolute channel number/frequency.

Further, a new mode of operation may be created to support such rapid motion. For example, the new mode may be a type of single downlink control information (DCI), multi-TRP mode. The new mode may include using multiple transmission configurations.

The techniques described herein may be implemented in and/or used with a number of different types of devices, including but not limited to mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, vehicle, automobile, unmanned aerial vehicles (e.g., drones) and unmanned aerial controllers, other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIGS. 6-16 illustrate aspects of performing communication in the case of a rapidly moving UE, according to some embodiments.

Figure 1:
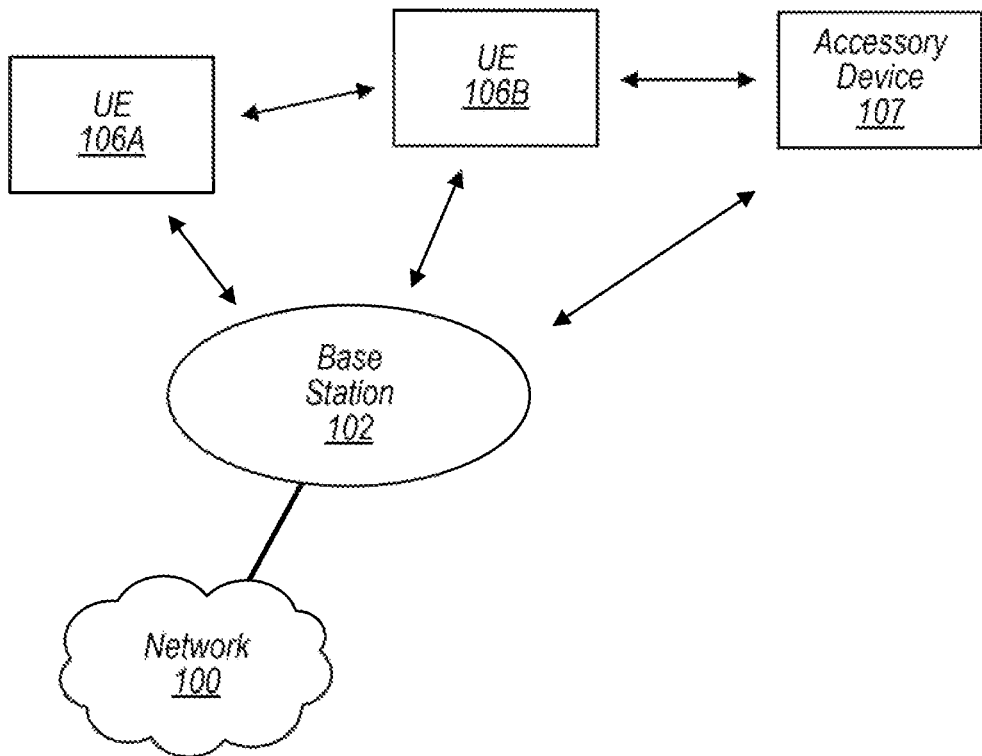
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms and Abbreviations

The following acronyms and abbreviations are used in the present disclosure.
3GPP: Third Generation Partnership Project
3GPP2: Third Generation Partnership Project 2
GSM: Global System for Mobile Communications
UMTS: Universal Mobile Telecommunications System
LTE: Long Term Evolution
IoT: Internet of Things
QCL: Quasi-Colocation
TCI: Transmission Configuration Indication
RRC: Radio Resource Control
MAC: Media Access Control
CE: Control Element
Tx: Transmission (or transmit)
Rx: Reception (or receive)
RS: Reference Signal
CSI: Channel State Information

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, vehicle, automobile, unmanned aerial vehicles (e.g., drones) and unmanned aerial controllers, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well as any of various combinations of the above.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
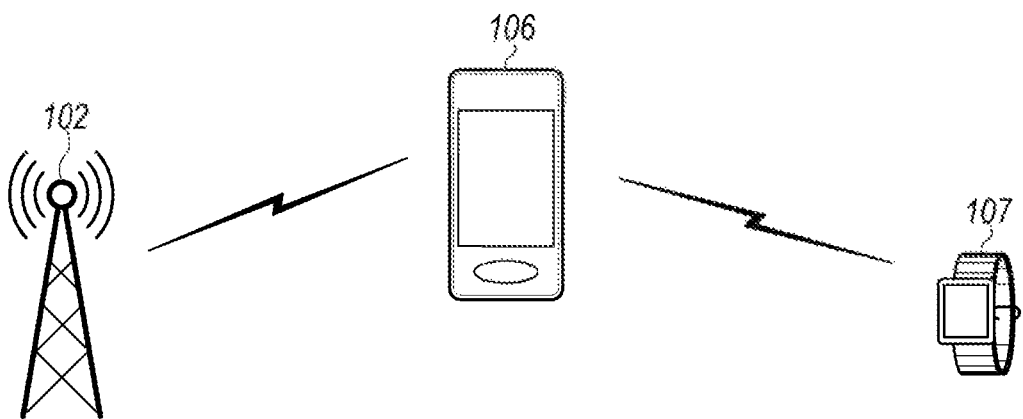
FIG. 2 illustrates an example wireless communication system in which two wireless devices can perform direct device-to-device communication, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware and/or software that enables wireless communication with the UE devices 106A, 106B, and 107. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. As also used herein, from the perspective of UEs, a base station may sometimes be considered as representing the network insofar as uplink (UL) and downlink (DL) communications of the UE are concerned. Thus, a UE communicating with one or more base stations in the network may also be interpreted as the UE communicating with the network.

In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1×RTT, 1×EV-DO, HRPD, eHRPD), Wi-Fi, etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of multiple wireless communication technologies. For example, a UE device 106/107 might be configured to communicate using one or more of GSM, UMTS, CDMA2000, LTE, LTE-A, NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi. In some instances, the UE 106B and the accessory device 107 may perform direct peer-to-peer communication using proximity services (ProSe) techniques, e.g., in a manner supported by a cellular base station. For example, such ProSe communication may be performed as part of a relay link to support a radio resource control connection between the accessory device 107 and the BS 102, such as according to various embodiments described herein.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102. For example, it may be the case that the UE 106A and UE 106B are capable of arranging and performing D2D communication (e.g., including discovery communications) with each other even when out-of-coverage of the BS 102 and other cellular base stations.

The BS 102 may control one or more transmission and reception points (TRPs) and may use the TRPs to communicate with the UEs. The TRPs may be collocated with the BS and/or at separate physical locations.

FIG. 2 illustrates an example BS 102 in communication with a UE device 106, which in turn is in communication with an accessory device 107. The UE device 106 and accessory device 107 may be any of a mobile phone, a tablet, or any other type of hand-held device, a smart watch or other wearable device, a media player, a computer, a laptop, unmanned aerial vehicle (UAV), unmanned aerial controller, vehicle, or virtually any type of wireless device. In some embodiments, the accessory device may be a wireless device designed to have low cost and/or low power consumption, and which may benefit from use of a relay link with the UE device 106 (and/or another companion device) to support communication with the BS 102. A device that utilizes a relay link with another wireless device to communicate with a cellular base station, such as in the illustrated scenario of FIG. 2, may also be referred to herein as a remote wireless device, a remote device, or a remote UE device, while a wireless device that provides such a relay link may also be referred to herein as a relay wireless device, a relay device, or relay UE device. According to some embodiments, such a BS 102, UE 106, and accessory device 107 may be configured to perform radio resource control procedures for remote wireless devices in accordance with various of the techniques described herein.

The UE 106 and accessory device 107 may each include a device or integrated circuit for facilitating cellular communication, referred to as a cellular modem. The cellular modem may include one or more processors (processing elements) that is configured to execute program instructions stored in memory, and/or various hardware components as described herein. The UE 106 and/or accessory device 107 may each perform any of the method embodiments described herein by executing such stored instructions. Alternatively, or in addition, the UE 106 and/or accessory device 107 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or accessory device 107 may include one or more antennas for communicating using one or more wireless communication protocols according to one or more RAT standards. In some embodiments, one or both of the UE 106 or accessory device 107 might be configured to communicate using a single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

Alternatively, the UE 106 and/or accessory device 107 may include two or more radios. For example, in some embodiments, the UE 106 and/or accessory device 107 may include separate transmit and/or receive chains (e.g., including separate antennas and other radio components) for each wireless communication protocol with which it is configured to communicate. As a further possibility, the UE 106 and/or accessory device 107 may include one or more radios that are shared between multiple wireless communication protocols, and one or more radios that are used exclusively by a single wireless communication protocol. For example, the UE 106 and/or accessory device 107 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
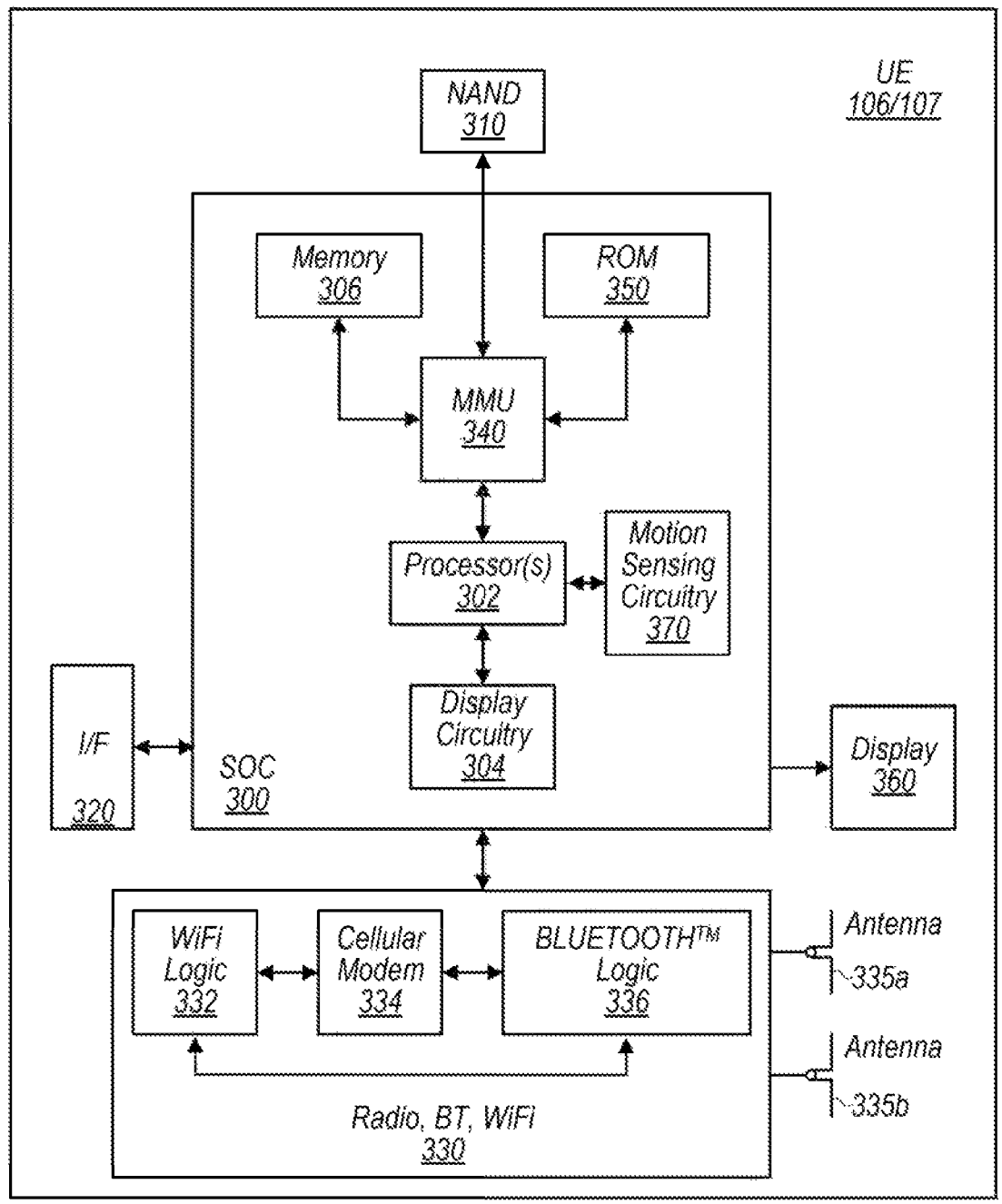
FIG. 3 is a block diagram illustrating an example wireless device, according to some embodiments.

FIG. 3—Block Diagram of a UE Device

FIG. 3 illustrates one possible block diagram of an UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310), and/or to other circuits or devices, such as the display circuitry 304, radio 330, I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using multiple wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. The processor(s) 302 of the UE device 106/107 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform radio resource control procedures for remote wireless devices according to various embodiments disclosed herein. Processor(s) 302 may also implement various other applications and/or end-user applications running on UE 106. Alternatively or additionally, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
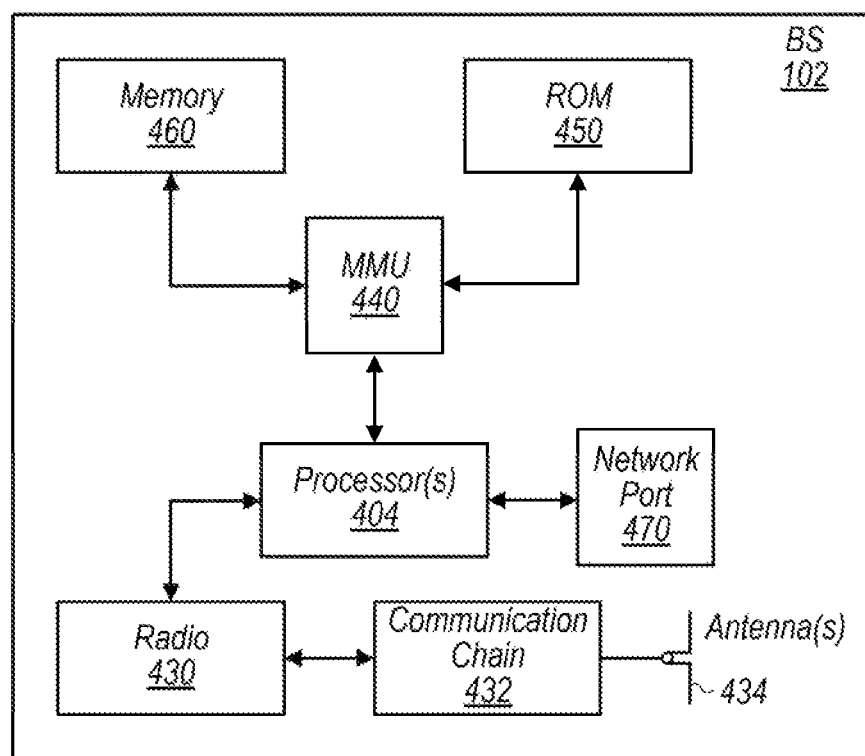
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. For example, the core network may include a mobility management entity (MME), e.g., for providing mobility management services, a serving gateway (SGW) and/or packet data network gateway (PGW), e.g., for providing external data connections such as to the Internet, etc. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and NR, LTE and Wi-Fi, LTE and UMTS, LTE and CDMA2000, UMTS and GSM, etc.).

As described further subsequently herein, the BS 102 may include hardware and software components for implementing or supporting implementation of features described herein. According to some embodiments, the processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of radio resource control procedures for remote wireless devices according to various embodiments disclosed herein, and/or any of various other of the features described herein.

Figure 5:
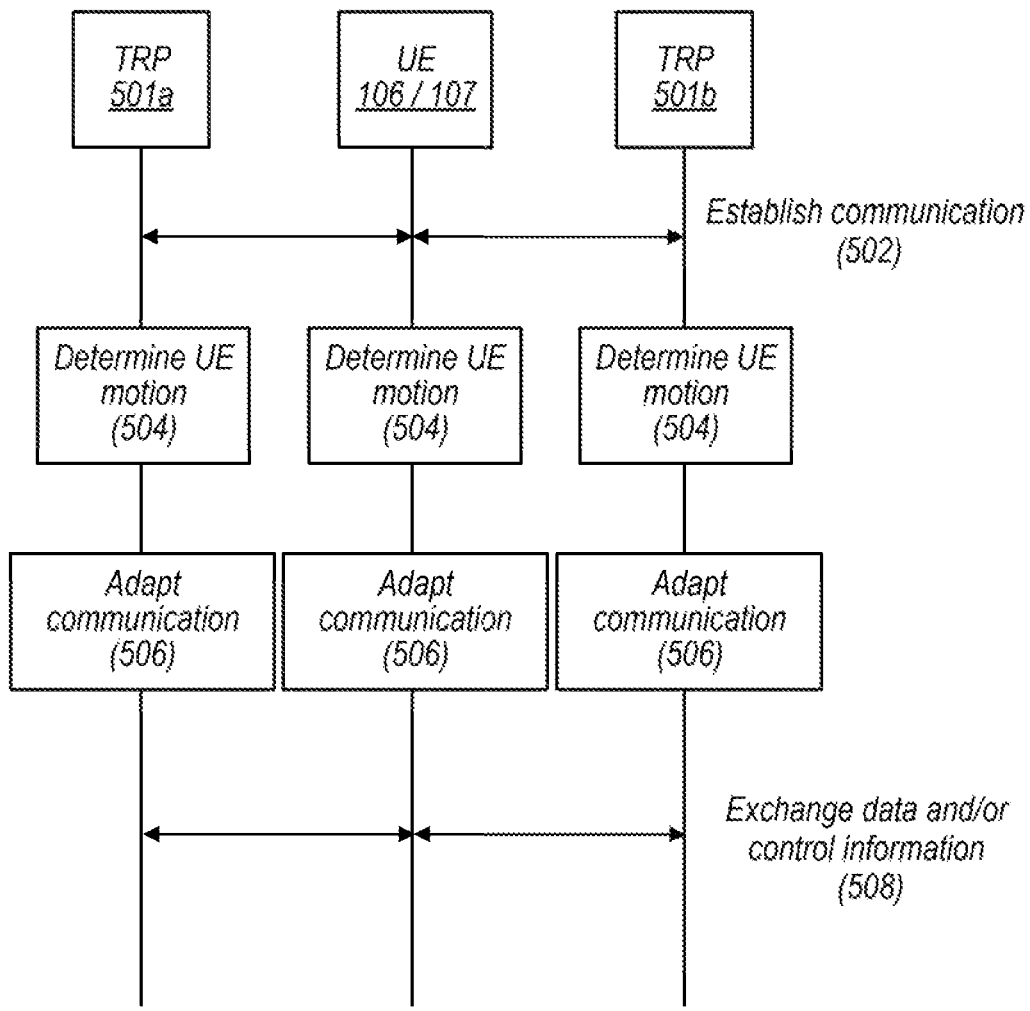
FIG. 5 is a communication flow diagram illustrating an example method for performing communication in the case of a rapidly moving UE, according to some embodiments.

FIG. 5—Communication Flow Diagram

High Speed Train (HST) is a deployment scenario a few operators are very interested in, especially for operators from countries/regions deploying HST systems (e.g., China). As a result, HST enhancement may be part of release 17 further enhanced (Fe) multiple-input, multiple output (MIMO) (FeMIMO). For example, a UE may travel between two transmission and reception points (TRP) in HST scenarios, or other scenarios including rapid travel. The UE may observe very high positive Doppler shift from one TRP, and very high negative Doppler shift from the other TRP. As a result, the composite channel may vary quickly. For example, Doppler shifts close to 4 kHz or even more may be observed. Such shifts may potentially reduce the channel capability and/or make it very challenging for UE to perform accurate channel estimation.

There may be two broad approaches for mitigating this channel variation. In one approach, a UE may estimate two separate Doppler shifts, e.g., one from each TRP, although more than two TRPs are also envisioned. The different Doppler shifts may be used to assist UE channel estimation, e.g., to perform different channel estimations for the different TRPs. In another approach, a network may compensate for the Doppler shift. Thus, the network may determine the Doppler shift for each TRP in order to compensate.

FIG. 5 is a communication flow diagram illustrating an example method for performing communication in the case of a rapidly moving UE, according to some embodiments. The method of FIG. 5 may mitigate some communication challenges associated with rapid motion. In various embodiments, some of the elements of the methods shown may be performed concurrently, in a different order than shown, may be substituted for by other method elements, or may be omitted. Additional method elements may also be performed as desired.

Aspects of the method of FIG. 5 may be implemented by a UE, such as the UEs 106 or 107, a cellular network, one or more transmission and reception point (TRP), and/or one or more BS 102, e.g., as illustrated in and described with respect to the Figures, or more generally in conjunction with any of the computer systems, circuitry, elements, components or devices shown in the Figures, among other devices, as desired. For example, one or more processors (or processing elements) (e.g., processor(s) 302, 404, baseband processor(s), processor(s) associated with communication circuitry such as 330, 430, or 432, processors associated with various core network elements, etc., among various possibilities) may cause a UE, network element, and/or BS to perform some or all of the illustrated method elements. Note that while at least some elements of the method of FIG. 5 are described in a manner relating to the use of communication techniques and/or features associated with LTE, NR, and/or 3GPP specification documents, such description is not intended to be limiting to the disclosure, and aspects of the method of FIG. 5 may be used in any suitable wireless communication system, as desired. As shown, the method may operate as follows.

A UE and may establish communication with a network via two TRPs (TRP 501*a* and TRP 501*b*) (502), according to some embodiments. It will be appreciated that the TRPs may be controlled by a single BS or by different BSs, according to various embodiments. The UE may be moving. For example, the UE may be moving toward one of TRP 501 and away from the other TRP 501. For example, the UE may be travelling on a high speed train (or in an automobile, drone, UAV, or other vehicle) along a route (e.g., train track, highway, path, etc.) and the TRP 501*a* and TRP 501*b* may be along or near the route. Thus, the UE may be getting closer to one TRP 501 and further from the other TRP 501. Accordingly, signals exchanged between the UE and the TRPs may be impacted by the motion. For example, signals may exhibit a Doppler shift or frequency offset due to the motion of the UE.

The network (e.g., a controlling BS 102 and/or either or both of TRP 501*a* and/or TRP 501*b*) and/or the UE may determine that the UE is moving rapidly (504), according to some embodiments. For example, the network and/or TRP 501 may determine that the UE is moving rapidly based on any or all of: radio measurements (e.g., of reference signals or other communications transmitted by the UE), reports from the UE (e.g., of radio measurements taken by the UE and/or based on motion sensing features of the UE, such as accelerometer, motion sensor, gyroscope, global navigational satellite systems such as GPS, etc.), knowledge of the UE's recent motion, and/or knowledge of transportation information (e.g., train schedules, highway routes, knowledge of motion of other UEs (e.g., multiple UEs in the same train/vehicle), etc.). Thus, in some embodiments, the network may be configured to infer the UEs movement from various different measurements or inputs. The UE may similarly determine its motion, e.g., based on similar information.

In some embodiments, the UE may explicitly indicate to the network information about its motion. For example, the UE may indicate to the network that it is on a high speed train or otherwise moving rapidly. Based on receiving such an indication, the network may determine that the UE is moving rapidly.

The network and/or UE may adapt communication techniques based on the motion of the UE (506), according to some embodiments. Such adaptation may include techniques for coordinating communication between two TRPs, e.g., a TRP that the UE is moving toward and a TRP that the UE is moving away from, among various possibilities. Such adaptation may include enhancement in any of the following areas:

Enhancements for downlink data transmission and reception, e.g., via reference signals (RS) used for demodulation. For example, demodulation reference signals (DMRS) associated with a physical downlink shared channel (PDSCH) may be scheduled, transmitted, and/or processed differently. For example, both TRPs may transmit DMRS or other RS to the UE, e.g., for use by the UE in communication with the TRPs at the same time. The RS transmitted by the different TRPs may be coordinated and may be orthogonalized in any of various manners (e.g., time division, frequency division, code division, and/or port division). For example, both TRPs may transmit UE-specific RS to the UE during a first slot (or frame or other time period), e.g., during the same or different symbols of the first slot.

Enhancements for transmission of control information to the UE, such as downlink control information (DCI) transmission. For example, RS (e.g., DMRS and/or other RS) associated with a physical downlink control channel (PDCCH) may be scheduled, transmitted, and/or processed differently, e.g., for reliability enhancement. For example, both TRPs may transmit RS to the UE, e.g., for use by the UE in communication with the TRPs at the same time. Multiple transmission configuration indication (TCI) states may be provided to the UE and used for communication between the UE and network and/or a new quasi-colocation (QCL) type may be defined and provided to the UE and used for communication between the UE and network.

Enhancements to spatial relation for uplink RS. For example, configurations for uplink RS such as sounding RS (SRS) or DL pathloss RS used for UL power control may be adapted.

A new operational mode (e.g., an HST mode). For example, a high speed travel mode may be created as a special case of (e.g., or variation on) a single-downlink control information (DCI) Multi-TRP mode. Such a new mode may be activated by an explicit indication (e.g., in DCI, RRC, MAC CE, or other control signaling) or by an implicit indication (e.g., based on other conditions).

The UE and the network (e.g., the TRP 501*a* and/or TRP 501*b*) may communicate using the adapted communication techniques (508), according to some embodiments. For example, while the UE is rapidly travelling between the TRP 501*a* and TRP 501*b*, the UE and the network may exchange data and/or control information using the adapted communication techniques. Data and/or control information may be exchanged in the UL and/or DL direction.

The UE and the network may continue to adapt communication techniques and communicate as the UE travels. For example, as a UE passes one TRP, the relationship (e.g., Doppler shift, frequency offset, spatial relation, QCL and/or other parameters) with the TRP may change. For example, the frequency offset with respect to a TRP may change signs when the UE passes the TRP.

Further examples and information about various types of adaptations to high speed motion of the UE (e.g., as introduced above regarding 506) are described below. It will be appreciated that the examples may be used together (e.g., in any of various combinations) and/or separately, according to some embodiments.

Downlink Data Enhancements

When a UE travels at very high speed towards a TRP or further away from a TRP, the UE may experience large frequency offset, in terms of Doppler shift, which may be linearly proportional to the UE speed and the carrier frequency. Therefore, at high frequency and when the UE travels very fast, e.g. close to or above 350 km/hr as in High Speed Train (HST), the frequency offset (Doppler shift) caused by the UE movement may be close to or exceeding 2 kHz, amounts to multiple cycles of channel phase and amplitude change every millisecond, which may be different from typical Multi-TRP operation. It may be challenging for UE to handle fast change variation due to the high speed movement in HST scenarios.

Figures 6, 7, 8:
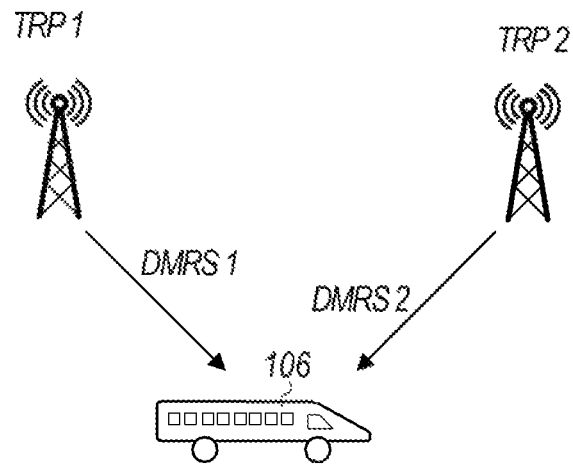

FIG. 6 illustrates downlink data enhancements (e.g., via PDSCH DMRS enhancement), according to some embodiments. As shown, a UE 106 may travel (e.g., on a train) between two TRPs, TRP 1 and TRP 2. It will be appreciated that the TRPs may be controlled by a single BS 102 or by different BSs, according to some embodiments. The RS transmitted by the different TRPs may be orthogonalized in any of various manners (e.g., time division, frequency division, code division, and/or port division). Thus, the RS transmitted by the TRPs may be used for temporally overlapping (e.g., concurrent) communication with both TRPs. In other words, the UE may maintain communication with both TRPs at the same time. For example, both TRPs may transmit RS to the UE during a same slot. The different TRPs may use the same or different symbols of the same slot.

The TRPs may transmit DMRS or other RS according to a non-Single Frequency Network (SFN) mode, according to some embodiments. For example, DMRS from the different TRPs may be transmitted to a rapidly moving UE that is communicating with both TRPs: (1) at different time(s) (e.g., time division multiplexing (TDM)), and/or (2) at different frequency location(s), (e.g., frequency division multiplexing (FDM)), and/or (3) with different DMRS ports, and/or (4) with different orthogonal codes (e.g., code division multiplexing (CDM)). For example, in response to determining that a UE is moving rapidly, e.g., in 504, the network may determine to transmit DMRS (and/or other RS) for use by the UE from multiple TRPs, e.g., concurrently or in overlapping or alternating times. The UE may use the DMRS (and/or other RS) in demodulating downlink data and/or control information sent by the corresponding TRP.

In some embodiments, the RS (e.g., DMRS) transmitted to the UE from the different TRPs may be UE specific. In other words, particular RS may be transmitted to the UE based on any of various factors such as the motion of the UE, scheduled communication between the UE and the TRPs, radio measurements of the channels between the UE and the TRPs, etc. The RS transmitted to the UE from the different TRPs may be the same or may be different, according to some embodiments.

In some embodiment, unlike the current DMRS design, different TRP may transmit different RS (e.g., DMRS) pattern to the UE. Thus, the which UE can separate the RS from different TRP. Such differentiation between the RS may reduce the channel variation caused by the high UE movement speed and to improve UE channel estimate quality. Thus, the RS may be both UE specific and TRP specific, according to some embodiments.

As illustrated in FIG. 7, DMRS (e.g., or UE-specific RS) from different TRP can be transmitted in different times (e.g., symbols 0-13 of a slot, e.g., in time, are shown horizontally; the frequency domain is illustrated vertically). For example, the DMRS location (e.g., in time/frequency) of a first TRP (e.g., TRP 501*a*) may be known from existing standards and/or configuration information. The DMRS location (e.g., in time/frequency) of a second TRP (e.g., TRP 501*b*) may be indicated via further control information (e.g., radio resource control (RRC), media access control (MAC) control element (CE), and/or downlink control information (DCI), etc.). The control information may be sent via multiple TRPs, or one of the TRPs, among various possibilities. For example, both the first and second TRPs may transmit the control information or only one of the TRPs (e.g., either the first or the second) may transmit the control information. Similarly, the DMRS location of the second TRP may be implicitly determined by the UE.

For example, a new (e.g., additional) symbol location for DMRS of a second (e.g., additional) TRP may be defined in a technical specification either explicitly or relative to the symbol location for DMRS of a first TRP. For example, the network may send control information to a UE indicating a location of DMRS from a second UE. The control information may explicitly identify particular location(s) for the DMRS (e.g., in terms of symbol and resource element (RE)). For example, in FIG. 7, the location of DMRS of TRP 2 may be in symbols 1 and 8. Alternatively, the control information may indicate an offset for the DMRS location of the second TRP relative to the first TRP (e.g., in the example of FIG. 7, the location of DMRS of TRP 2 may be offset by 1 symbol relative to the DMRS of TRP1).

In some embodiments, existing DMRS symbols locations (e.g., symbols designated for DMRS transmission according to existing specifications and/or control information) may be split between a first and second TRP when multiple DMRS positions are configured. In other words, if a first number of REs in a slot may be designated for RS (e.g., by previous control information and/or standards), the first number of REs may be subdivided so that one subset of the REs is used for RS of TRP 1 and a second subset of the REs is used for RS of TRP 2. Control information may be used to indicate the subdivision of the RS locations when the second RS is configured.

It will be appreciated that, although the time locations (e.g., symbols) of the RS associated with the TRPs are different, that the UE is communicating with the TRPs at the same time. In other words, the time locations overlap and are time-division multiplexed (TDMd). For example, the TRPs may transmit RS in different symbols of a same slot, e.g., the first TRP may use a first symbol or symbols and the second TRP may use a second symbol or symbols.

FIG. 8 illustrates DMRS transmission from different TRPs on different frequencies, according to some embodiments. The DMRS transmissions of FIG. 8 may be indicated using any combination of the techniques described above. For example, RS locations may be indicated explicitly or using an offset; existing RS locations may be subdivided.

Another approach to orthogonalizing RS of the different TRPs may be via code division multiplexing (CDM). For example, DMRS from different TRPs may be transmitted in different CDM groups. Each CDM group can support up to four ports via orthogonal codes, according to some embodiments. Different CDM groups may be orthogonalized via frequency division multiplexing (FDM). Various approaches may be used to orthogonalize RS of the TRPs depending on the number of CDM groups configured for the UE.

When a single CDM group is configured, there may be one or more (e.g., pre-defined) ports indicated in the CDM group for DMRS (e.g., or other RS). Thus, the one or more ports indicated for RS may be used for transmissions of RS and/or data for one TRP. One or more other ports (e.g., the remaining ports) of the CDM group may be used for transmissions of RS and/or data for another TRP. In some embodiments, which ports are used for which TRP may be explicitly signaled in control information or implicitly indicated (e.g., based on scheduling a single TRP on a particular port(s)). For example, if 1 CDM group is configured (e.g., by DCI) and DCI (or other control information) indicates a port (or ports) for DMRS, that port (or ports) may be used for a first TRP; any other port may be used for DMRS of the other TRP. In some embodiments, data from each TRP may use the same port(s) as the RS from the corresponding TRP.

When two CDM groups are configured, the DMRS port(s) in the first CDM group may correspond to one TRP and the DMRS port(s) in the second CDM group may correspond to the other TRP. Thus, as illustrated in FIG. 9, REs may be divided (e.g., alternating, in the example, but other divisions may be used, as desired) between the two CDM groups. Each CDM group may be used for DMRS from different TRP. In the illustrated example, REs in the first CDM group may be used for the DMRS from the first TRP and REs in the second CDM group may be used for the DMRS from the second TRP. The transmissions of CDM group 1 may be performed by one TRP and the transmissions of CDM group 2 may be performed by another TRP. The UE may (e.g., jointly) use the DMRS of each TRP (e.g., each CDM group) to demodulate the corresponding data. For example, in the case that the two TRPs transmit duplicate data (e.g., TRP 2 transmits a copy of the data transmitted by TRP 1), the UE may use the combination of the DMRS from each TRP to estimate the channel and demodulate the data. Alternatively, in the case that the two TRPs transmit different data, the UE may use the DMRs from one TRP to estimate the channel from that TRP and demodulate the data. The data may be transmitted in different frequencies (e.g., at the same time as the RS), at different times (e.g., different symbols, but potentially the same frequencies) than the RS, and/or using different antenna ports than the RS.

When three CDM groups are configured, the DMRS port(s) in a first subset (e.g., 1 or 2) of the CDM groups may correspond to one TRP and the DMRS ports in the rest of the CDM groups may correspond to the other TRP. FIG. 10 illustrates an example with three CDM groups, according to some embodiments. CDM group 0 may correspond to a first TRP and CDM groups 1 and 2 may correspond to a second TRP. In the illustrated example, REs in CDM group 0 may be used for the DMRS corresponding to the first TRP and REs in CDM groups 1 and 2 may be used for the DMRS corresponding to the second TRP. The UE may (e.g., jointly, in the case that the different TRPs transmit duplicate data) use DMRS from both the first TRP and the second TRP, transmitted in CDM groups 0, 1 and 2, to decode the data of PDSCH channel. Alternatively, in the case that the TRPs transmit different data, the UE may use the DMRS of CDM group 1 to decode the data of CDM group 2, e.g., because CDM groups 1 and 2 are transmitted by the same TRP and thus share channel characteristics. Note it is also possible to partition such that CDM groups 0 and 1 correspond to the first TRP and CDM group 2 corresponds to the second TRP.

In another approach for orthogonalizing RS, RS from different TRP may be transmitted using different ports. For example, the UE may receive the RS from the different TRPs using different antenna ports.

In some embodiments, a second antenna ports field may be introduced in DCI. The second antenna ports field may be a replica (e.g., duplicate of) the existing ports field. Thus, a network (e.g., base station) may indicate the antenna port configuration for RS from each TRP separately, e.g., via DCI. For example, in a DCI message to the UE, the network may indicate a first port for DMRS of TRP 1 and a second port for DMRS of TRP 2.

In some embodiments, a new table for antenna ports field interpretation (e.g., in 38.212) may be introduced. Such a table may specify two different ports (e.g., for different TRPs) for at least some values of the antenna ports field. Thus, for such an antenna ports field indication, two set of DMRS ports may be defined: one set of DMRS ports for the first TRP and the second set of DMRS ports for the second TRP.

In some embodiments, the data transmitted (e.g., associated with the RS) from the TRPs may be the same. For example, the first TRP may transmit first data to a UE during a slot. During the same slot (e.g., in the same and/or different symbols, e.g., using any of the orthogonalizing techniques discussed above), the second TRP may transmit second data to the UE. The second data may be a copy of the first data. The first data may be demodulated using RS from the first TRP and the second data may be demodulated using RS from the second TRP. The UE may combine the channels before decoding the data. In other words, the UE may rely on both the first data and the second data (e.g., a copy of the first data) to determine the content of the first/second data.

Downlink Control Channel Enhancements

FIGS. 1-15 illustrate aspects of downlink control channel (e.g., PDCCH) reliability enhancement, according to some embodiments. Multiple TRPs may use the same control resource set (CORESET) to transmit control information to the UE, according to some embodiments. Similar to the discussion of downlink data enhancements above, the RS transmitted by the different TRPs may be orthogonalized in various manners, e.g., frequency division, code division, and/or port division. Thus, the RS transmitted by the TRPs may be used for temporally overlapping (e.g., concurrent) communication with both TRPs. In other words, the UE may maintain communication with both TRPs at the same time. For example, both TRPs may transmit UE-specific RS to the same UE during each symbol of the CORESET. Further, as noted above, the RS may be TRP specific, and the UE may differentiate between the RS of the different TRPs.

Moreover, the various techniques discussed above (e.g., regarding downlink data) may be adapted for control channels, according to some embodiments. It will be appreciated that current control channel designs include RS in each symbol (e.g., time interval), accordingly, time division may not be applicable. However, time division as discussed above regarding data enhancements could also be applied to control channels that do not include RS in each time interval, according to some embodiments.

In some embodiments, PDCCH may have separate RS (e.g., DMRS) transmission from different TRP. For example, the RS associated with PDCCH may be transmitted from the second TRP, e.g., in addition to the first TRP.

Figures 11, 12, 13:
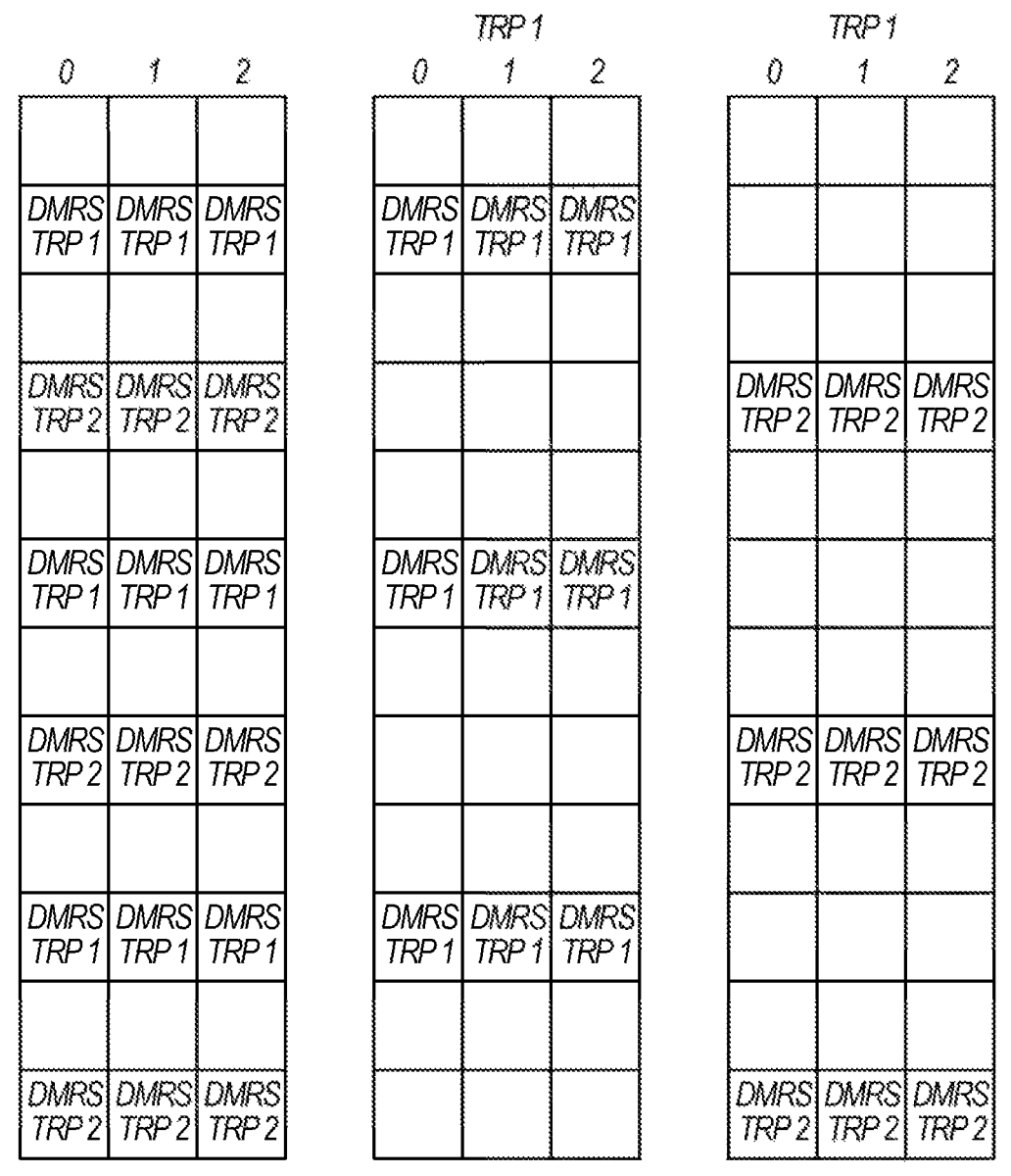

As one approach to orthogonalizing the RS of the different TRPs, frequency division may be used. FIG. 11 illustrates a combined resource grid, e.g., showing DMRS transmissions from each TRP on a control channel, according to some embodiments. FIG. 12 illustrates DMRS transmissions from TRP 1 and FIG. 13 illustrates DMRS transmissions from TRP 2, according to some embodiments. In other words, FIGS. 12 and 13 illustrate the individual RS transmissions of TRPs 1 and 2, respectively, according to some embodiments.

As shown, DMRS may be transmitted by each TRP in each symbol of the CORESET. The DMRS may be transmitted by each TRP at various frequencies, e.g., in periodically spaced REs. In the illustrated example, DMRS may be transmitted in every four REs in each CORESET symbol by each TRP. Note that other spacings may be used as desired. For example, the RE offset of the DMRS of TRP 2 is three and the RE offset of the DMRS of TRP 1 is one. In other words, the DMRS of each TRP may occur in every 4 REs, with TRP 1 in a second RE (e.g., offset by 1) and TRP 2 in a fourth RE (e.g., offset by 3).

As another approach to orthogonalizing the RS of the different TRPs, code division may be used. In other words, the different TRPs may transmit the RS at the same times and in the same frequencies, but may use orthogonal codes for the transmission. For example, in a symbol, for respective resource blocks (RBs), the first the second RE may be used for DMRS. Other patterns may be used as desired.

Figures 14, 15:
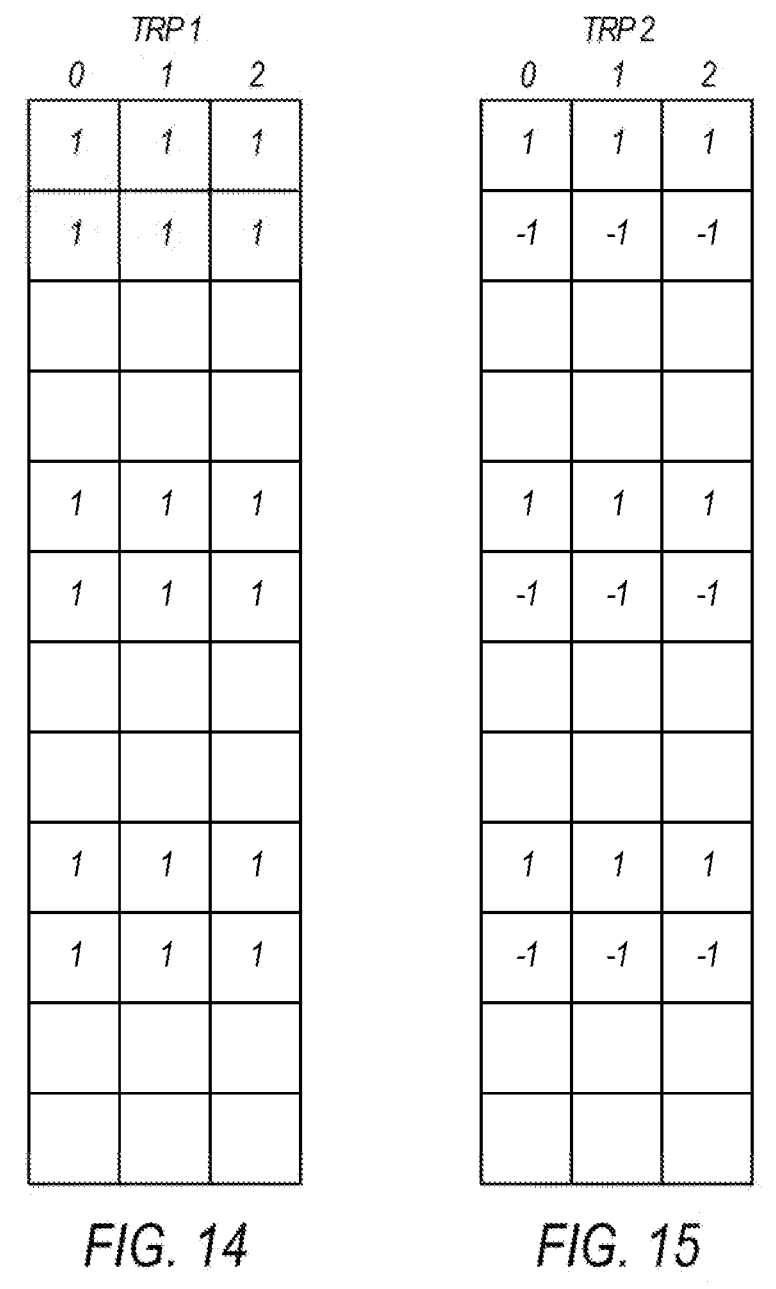

FIGS. 14 and 15 illustrate code division multiplexing (CDM) of RS for a downlink control channel, according to some embodiments. As illustrated in FIG. 14, the TRP 1 may use the pattern (1 1) to transmit RS and as illustrated in FIG. 15, the TRP 2 may use the pattern (1-1). Based on the orthogonality of these patterns, the UE may be able to receive both the RS from TRP 1 and the RS from TRP 2 and use these RS to demodulate control information from TRP 1 and TRP 2. The TRPs may transmit control information in the REs not used for RS transmission.

Another approach to downlink control channel reliability enhancement may include configuring different transmission configuration indication (TCI) states for the different TRPs. In some embodiments, a MAC CE may be used to configure two TCIs for a CORESET PDCCH. For example, a first TRP may transmit a MAC CE to the UE that indicates a first TCI for the first TRP and a second TCI for a second TRP.

A TCI state may indicate a quasi-colocation (QCL) relationship between one or more of various (e.g., periodic) RS and the control and/or data channels (e.g., PDCCH and/or PDSCH, etc.) that a TRP may use to transmit to the UE. Thus, the UE may use the RS (e.g., that is QCL with the control and/or data channels according to the TCI) to decode DL transmissions from the TRP 501. The TRP 501 may use higher layer signaling (e.g., radio resource control (RRC)) to configure any number of TCI states and (e.g., later) use lower layer signaling (e.g., downlink control information (DCI)) to select a TCI state to use.

In some embodiments, a plurality of TCI codepoints may be defined and configured by RRC. A TCI codepoint may contain two TCIs states, e.g., one TCI state for each of two TRPs. Thus, in response to an indication of a TCI codepoint with two TCI states (e.g., in DCI or a MAC CE), the UE may use a first TCI state for a first TRP and a second TCI state for a second TRP. It will be appreciated that TCI codepoints with one TCI state may be used for single TRP operation and/or single DCI operation. Further, TCI codepoints with more than two TCI states may be used, according to some embodiments.

In some embodiments, a MAC CE may indicate two TCI States for the same CORESET. FIG. 16 illustrates a MAC CE with an indication of a second TCI state (e.g., TCI state ID 2 is added). Thus, in response to receiving a MAC CE with two TCI state IDs, the UE may use a first TCI state for a first TRP and a second TCI state for a second TRP. A MAC CE with a single TCI state ID may be used for single TRP operation and/or single DCI operation.

Another approach to downlink control channel reliability enhancement may include use of a new quasi-colocation (QCL) type to indicate two RS are QCL with respect to Doppler shift or frequency offset. In standards documents, (e.g., 3GPP Release 15), the following four QCL types may be previously defined (see, e.g., 5.1.5 in 38.214):

'QCL-TypeA': {Doppler shift, Doppler spread, average delay, delay spread},
  'QCL-TypeB': {Doppler shift, Doppler spread},
  'QCL-TypeC': {Doppler shift, average delay}, and
  'QCL-TypeD': {Spatial Rx parameter}.

Thus, in some embodiments, a fifth QCL-Type (e.g., TypeE) may be defined. The fifth type may be described, for example, as:

'QCL-TypeE': {Doppler shift}

In other words, the new type may be a standalone QCL, e.g., only based on Doppler shift. This may be a contrast to current QCL types which may bundle Doppler shift with other properties (e.g., Doppler spread in the case of QCL-TypeB).

In some embodiments, the control information data transmitted (e.g., associated with the RS) from the TRPs may be the same. For example, the first TRP may transmit first control information to a UE during a slot/CORESET. During the same slot/CORESET (e.g., using any of the orthogonalizing techniques discussed above), the second TRP may transmit second control information to the UE. The second control information may be a copy of the first control information. The first control information may be demodulated using RS from the first TRP and the second control information may be demodulated using RS from the second TRP. The UE may combine the channels before decoding the control information. In other words, the UE may rely on both the first control information and the second control information (e.g., a copy of the first control information) to determine the content of the first/second control information.

Uplink RS Enhancements

Sounding reference signal (SRS) and/or other uplink RS may be enhanced in order to support uplink transmissions to the network. For example, uplink RS may be used by the network to determine the UEs velocity and/or for channel estimation and/or to correct for the motion of the UE.

In some embodiments, a MAC CE may be used to update configurations for periodic SRS (P-SRS). For example, a MAC CE may be used to indicate which pathloss RS may be used by the UE in order to estimate the pathloss between the UE and the TRP for determination of the transmit power of P-SRS based on open loop power control. The same MAC CE or a different MAC CE may be used to indicate a spatial relation (e.g., uplink beam of the UE) to use for transmitting the uplink RS. The MAC CE may indicate multiple spatial relations (e.g., similar to the discussion of one MAC CE indicating multiple TCI states directly or indicating a TCI codepoint with multiple TCIs). For example, the MAC CE may indicate multiple spatial relations directly or may indicate a spatial relation codepoint that defines multiple spatial relations. Thus, the UE may transmit the RS using the multiple spatial relations. The multiple spatial relations may correspond to multiple TRPs (e.g., a first spatial relation to a first TRP, etc.). The network may use the RS received at the respective TRPs to estimate the channel between the UE and the respective TRPs and/or to demodulate uplink transmissions from the UE to the respective TRPs. Using a MAC CE to update the configuration of the uplink RS (e.g., including the spatial relation) may be faster than using RRC to update the configurations. DCI may be used to update the configuration of the uplink RS, according to some embodiments.

In some embodiments, a spatial relation definition may be extended to include frequency offset. Thus, according to one or more configured spatial relation, the UE may transmit SRS or other uplink RS based on the frequency offset estimated from the spatial relation RS. In some embodiments, the spatial relation RS may be configured as downlink RS (e.g., CSI-RS or SSB), uplink RS (e.g., SRS), or both downlink and uplink RS. In other words, the UE may offset the frequency of the uplink RS that it transmits by the frequency offset of the spatial relationship. Thus, the UE may "pre-correct" the uplink RS for the Doppler shift associated with the UE's motion. Different frequency offsets may be used for different spatial relationships, e.g., a UE may use a first spatial relationship with a first offset to transmit to a first TRP and a second spatial relationship with a second offset to transmit to a second TRP. The frequency offset may be determined in various ways. For example, the network may determine one or more frequency offset (e.g., based on measurements of previous uplink RS from the UE, data reported from the UE, or other knowledge of the UE's motion) and may indicate a frequency offset for the UE to use for one or more spatial relation. As another example, the UE may determine the frequency offset for a spatial relation (e.g., based on measurements of downlink RS or other knowledge of the UE's motion). In some embodiments, a frequency offset for one spatial relation may be determined based on a frequency offset for another spatial relation. For example, if a frequency offset for a TRP ahead of the UE (e.g., in the UE's direction of travel) is known, a frequency offset of another TRP behind the UE may be determined by reversing the sign (e.g., multiplying by −1) of the frequency offset.

In some embodiments, the UE may transmit SRS or other uplink RS based on the absolute channel number (e.g., a frequency without an offset, e.g., as determined by a lower layer, e.g., layer 1), irrespective of the estimated frequency offset. In other words, the uplink RS may be transmitted without any frequency correction (by the UE) for the UE's motion. At the receiver side, a TRP may estimate the UE frequency offset due to UE motion from the SRS. From the UE frequency offset estimate, the TRP may correct for the motion of the UE. For example, a TRP may apply an offsetting (e.g., opposite) frequency offset during transmission to the UE, e.g., so that the received signal at the UE side is not affected by the UE motion, according to some embodiments.

In some embodiments, a tracking RS (TRS) can be configured as spatial relation to semi-periodic (SP) SRS, aperiodic (AP) SRS, and/or P-SRS. For example, a UE may estimate the frequency offset from the configured TRS, and the frequency offset may be used to determine the UL transmission frequency of P/SP/AP-SRS to which the TRS is configured as spatial relation.

New mode of communication in the case of a rapidly traveling UE

A new operational mode may be configured for use by a network and a UE when the UE is traveling fast. For example, such a mode may be referred to as high speed train (HST) mode, among various possibilities. Such a mode may be useful for single-DCI, multi-TRP operation. For example, release 16 single-DCI multi-TRP operation can be enhanced to support high speed travel such as a UE on a HST. In other words, a special mode of single-DCI multi-TRP operation may be configured.

In some embodiments, in the new mode, the RRC configured TCI codepoint may contain two TCI States. For example, as discussed above, one TCI state may be used to communicate with one TRP and another TCI state for another TRP. For example, the UE may transmit uplink RS according to the TO states and/or the network may transmit downlink RS to the UE according to the TCI states.

In some embodiments, QCL and/or spatial relations may be configured for multiple TRPs in the new mode.

In some embodiments, in the new mode, various of the adaptations discussed above may be applied by the UE and/or the network/TRP(s).

In some embodiments, in the new mode, one of the TRPs may provide DCI for uplink and downlink communications with both TRPs.

The new mode may be entered (e.g., by the UE and/or network/TRP(s)) when one or more of the following conditions are true:

A first condition may include that repetitionScheme-r16 is not configured by RRC. In other words, the first condition may include that none of the following single DCI Multi-TRP modes is configured: (1) FDMSchemeA, (2) FDMSchemeB, and/or (3) TDMSchemeA, according to some embodiments.

A second condition may include that at least one of: repetitionNumber-r16 is not configured in any entry in PDSCH-TimeDomainResourceAllocation and/or repetitionNumber-r16 is not indicated in the DCI filed Time domain resource assignment. In other words, the single DCI Multi-TRP scheme 4, or inter-slot TDM scheme, is not configurable.

If both of the above conditions are true, and 1 or 3 CDM groups is indicated in DCI antenna port(s) field, the network and/or UE may consider the conditions an implicit indication to operate according to the new mode of operation. For example, a third condition may include that either one or three CDM groups is configured.

Alternatively, the network may explicitly configure (e.g., by RRC and/or MAC CE) the new mode of operation.

Based on an implicit or explicit indication, the UE and the network may operate according to the new mode, e.g., until conditions change or an explicit indication to change modes is sent.

In some embodiments, a further condition for entering the new mode may be that the UE is moving rapidly (e.g., above a threshold speed). Thus, the UE may not enter the new mode if it is not moving sufficiently fast. The motion/speed may be determined based on various means, including but not limited to radio measurements, GNSS, motion sensors, etc.

In some embodiments, downlink RS transmitted by one or more TRPs may be corrected for Doppler shift using frequency offset, e.g., in a manner similar to that described above for uplink RS.

In some embodiments, the UE may determine frequency offset information based on downlink RS from one or more TRPs. The UE may apply the frequency offset information to transmission of uplink RS to one or more TRPs.

In some embodiments, the network may determine frequency offset information based on uplink RS from the UE to one or more TRPs. The network may apply the frequency offset information to transmission of downlink RS to the UE from one or more TRPs.

In a first set of embodiments, a base station, may comprise: a radio; and a processor operably connected to the radio and configured to cause the base station to: transmit, from a first transmission and reception point (TRP) to a user equipment device (UE), first reference signals (RS) during a first symbol; transmit, from a second TRP to the UE, second RS during the first symbol; transmit, from the first TRP to the UE, first control information during the first symbol, wherein the first control information is configured to be demodulated using the first RS; and transmit, from the second TRP to the UE, second control information during the first symbol, wherein the second control information is configured to be demodulated using the second RS.

In some embodiments, the first RS and the second RS may be transmitted at multiple resource elements during the first symbol, wherein resource elements on which the second RS are transmitted are offset relative to resource elements on which the first RS are transmitted.

In some embodiments, the first RS and the second RS may be transmitted at multiple resource elements during the first symbol, wherein resource elements on which the second RS are transmitted are the same as resource elements on which the first RS are transmitted, wherein the first RS and the second RS are orthogonalized using code division multiplexing.

In some embodiments, the processor may be further configured to cause the base station to: transmit, from the first TRP to the UE, control information comprising a transmission configuration indication (TCI) codepoint, wherein the TCI codepoint indicates a first TCI state and a second TCI state, wherein the first RS is transmitted according to the first TCI state and the second RS is transmitted according to the second TCI state.

In some embodiments, the processor may be further configured to cause the base station to: transmit, from the first TRP to the UE, control information comprising a media access control (MAC) control element (CE), wherein the MAC CE indicates a first transmission configuration indication (TCI) state and a second TCI state for a first control resource set (CORESET), wherein the first RS is transmitted according to the first TCI state and the second RS is transmitted according to the second TCI state, wherein the first symbol is associated with the first CORESET.

In some embodiments, the processor may be further configured to cause the base station to: transmit, from the first TRP to the UE, control information comprising an indication that the first RS is quasi-colocated with a third RS with respect to at least one of Doppler shift or frequency offset.

In some embodiments, the control information may further comprise an indication that the second RS is quasi-colocated with a fourth RS with respect to at least one of Doppler shift or frequency offset.

In some embodiments, the processor may be further configured to cause the base station to: transmit, from the first TRP to the UE, control information comprising a media access control (MAC) control element (CE), wherein the MAC CE indicates to the UE to update a configuration of a periodic sounding RS; and receive, from the UE at the first TRP and at the second TRP, the periodic sounding RS according to the configuration.

In a second set of embodiments, an apparatus, may comprise: a processor configured to cause a base station of a cellular network to: establish communication with a UE via a first transmission and reception point (TRP); transmit, to the UE from the first TRP, a media access control (MAC) control element (CE), wherein the MAC CE includes an indication to use multiple spatial relations for transmission of uplink periodic reference signals (RS); receive, from the UE via the first TRP, the uplink RS according to a first spatial relation of the multiple spatial relations; and receive, from the UE via a second TRP, the uplink RS according to a second spatial relation of the multiple spatial relations.

In some embodiments, the uplink periodic RS may be sounding RS.

In some embodiments, the MAC CE further includes an indication of pathloss RS for uplink power control of the uplink periodic RS.

In some embodiments, the first spatial relation may include a first frequency offset.

In some embodiments, the second spatial relation may include a second frequency offset different from the first frequency offset.

In some embodiments, the processor may be further configured to cause the base station to determine that the UE is moving rapidly between the first TRP and the second TRP, wherein the transmission of the MAC CE is in response to the determination.

In some embodiments, the processor may be further configured to cause the base station to compensate for a Doppler shift of the uplink RS, wherein the Doppler shift of the uplink RS received via the first TRP is different than the Doppler shift of the uplink RS received via the second TRP.

In a third set of embodiments, a method, may comprise: at a cellular network: establishing communication with a user equipment device (UE); determining that the UE is moving rapidly between a first transmission and reception point (TRP) and a second TRP; in response to the determination: causing the first TRP to transmit, to the UE, first demodulation reference signals (DMRS) on first time/frequency resources, wherein the first time/frequency resources are within a first slot, wherein the first DMRS is UE-specific; and causing the second TRP to transmit, to the UE, second DMRS on second time/frequency resources, wherein the second time/frequency resources are within the first slot and are different from the first time/frequency resources, wherein the second DMRS is UE-specific; causing the first TRP to transmit, to the UE, first data to be demodulated using the first DMRS; and causing the second TRP to transmit, to the UE, second data to be demodulated using the second DMRS.

In some embodiments, the first time/frequency resources are time/frequency resources associated with DMRS transmitted to UEs that are not determined to be moving rapidly.

In some embodiments, the method may further comprise: causing at least one of the first TRP or the second TRP to transmit, to the UE, an indication of the second time/frequency resources.

In some embodiments, the indication may comprise an indication of an offset of the second time/frequency resources relative to the first time/frequency resources.

In some embodiments, the method may further comprise: splitting the time/frequency resources associated with DMRS transmitted to the UEs that are not determined to be moving rapidly, wherein the second time/frequency resources and the first time/frequency resources are separate subsets of the time/frequency resources associated with DMRS transmitted to UEs that are not determined to be moving rapidly.

In some embodiments, the first time/frequency resources may be associated with a first code division multiplexing (CDM) group and the second time/frequency resources are associated with a second CDM group.

In a fourth set of embodiments, a user equipment device (UE), may comprise: a radio; and a processor operably connected to the radio and configured to cause the UE to: determine that: the UE is moving rapidly between a first transmission and reception point (TRP) and a second TRP; a repetition scheme is not configured; and either 1 or 3 code division multiplexing groups is indicated in an antenna ports field; in response to the determination, enter a first mode of operation, wherein the first mode of operation is associated with high speed travel.

In some embodiments, the first mode of operation may comprise a single downlink control information (DCI), multi-TRP mode.

In some embodiments, according to the first mode a transmission configuration indication (TCI) codepoint may be configured, wherein the TCI codepoint indicates a first TCI state and a second TCI state.

In some embodiments, the processor may be further configured to cause the UE to: receive a first reference signal (RS) from the first TRP according to the first TCI state; and receive a second RS from the second TRP according to the second ICI state.

In some embodiments, the first RS may be a channel state information RS, wherein the first RS is received during a first symbol, wherein the processor may be further configured to cause the UE to: receive, from the first TRP, control information during the first symbol; and demodulate the control information using the first RS.

In some embodiments, the processor may be further configured to cause the UE to: transmit a first reference signal (RS) to the first TRP according to the first TCI state; and transmit a second RS to the second TRP according to the second ICI state.

In some embodiments, the processor may be further configured to cause the UE to perform uplink transmissions to the first TRP and to the second TRP according to the first mode.

In a fifth set of embodiments, an apparatus, may comprise: a processor configured to cause a user equipment device (UE) to: establish communication with a first transmission and reception point (TRP) of a network; receive, from the first TRP, a media access control (MAC) control element (CE), wherein the MAC CE includes an indication to use multiple spatial relations for transmission of uplink periodic reference signals (RS); transmit, to the first TRP, the uplink RS according to a first spatial relation of the multiple spatial relations; and transmit, to a second TRP, the uplink RS according to a second spatial relation of the multiple spatial relations.

In some embodiments, the processor may be a baseband processor.

In some embodiments, the uplink periodic RS may be sounding RS.

In some embodiments, the MAC CE includes an indication of pathloss RS to use for uplink power control of the uplink periodic RS In some embodiments, to transmit the uplink RS to the first TRP may include performing uplink power control based on pathloss RS from the first TRP.

In some embodiments, to transmit the uplink RS to the second TRP may include performing uplink power control based on pathloss RS from the second TRP.

In some embodiments, the first spatial relation may include a first frequency offset.

In some embodiments, the second spatial relation may include a second frequency offset different from the first frequency offset.

In some embodiments, transmitting the uplink RS according to the first spatial relation may correct the uplink RS for motion of the UE.

In some embodiments, transmitting the uplink RS may be based on a channel number without a frequency offset.

In a sixth set of embodiments, a method, may comprise: at a user equipment device (UE): establishing communication with a cellular network; receiving, from a first transmission and reception point (TRP) of the cellular network, first downlink reference signals (RS); receiving, from a second TRP of the cellular network, second downlink RS, wherein the second downlink RS are orthogonal to the first downlink RS; communicating with the first TRP and the second TRP at the same time, wherein said communicating includes: receiving, from the first TRP a first downlink signal; demodulating the first downlink signal using the first downlink RS; receiving, from the second TRP a second downlink signal; and demodulating the second downlink signal using the second downlink RS.

In some embodiments, the first downlink RS and the second downlink RS may be time division multiplexed, wherein the first downlink signal and the second downlink signal may be data communications.

In some embodiments, the first downlink RS and the second downlink RS may be received according to different antenna ports.

In some embodiments, the first downlink RS and the second downlink RS may be code division multiplexed.

In some embodiments, the first downlink RS and the second downlink RS may be frequency division multiplexed.

In some embodiments, the method may further comprise: determining frequency offset information based on the first downlink RS; and applying the frequency offset information to first uplink RS transmitted to the first TRP.

In various embodiments, various combinations of the adaptations described above may be performed together. For example, the network may send control information to a UE to cause the UE to process downlink RS according to embodiments discussed above and to transmit uplink RS according to embodiments discussed above.

Yet another exemplary embodiment may include a method, comprising: by a wireless device: performing any or all parts of the preceding examples.

Another exemplary embodiment may include a wireless device, comprising: an antenna; a radio coupled to the antenna; and a processing element operably coupled to the radio, wherein the device is configured to implement any or all parts of the preceding examples.

Still another exemplary embodiment may include an apparatus, comprising: a processing element configured to cause a wireless device to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Any of the methods described herein for operating a user equipment (UE) may be the basis of a corresponding method for operating a base station, by interpreting each message/signal X received by the UE in the DL as message/signal X transmitted by the base station, and each message/signal Y transmitted in the UL by the UE as a message/signal Y received by the base station.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
   determining that three conditions for entering a high speed travel mode of operation are met, wherein the three conditions are:
   a user equipment device (UE) is moving rapidly between a first transmission and reception point (TRP) and a second TRP;
   a repetition scheme is not configured for the UE by radio resource control (RRC); and
   either 1 or 3 code division multiplexing groups is indicated for the UE in an antenna ports field; and
   in response to the determination, entering the high speed travel mode of operation.

2. The method of claim 1, wherein the high speed mode of operation comprises a single downlink control information (DCI), multi-TRP mode.

3. The method of claim 1, wherein, according to the high speed mode of operation a transmission configuration indication (TCI) codepoint is configured, wherein the TCI codepoint indicates a first TCI state and a second TCI state.

4. The method of claim 3, further comprising:
   receiving a first reference signal (RS) from the first TRP according to the first TCI state; and
   receiving a second RS from the second TRP according to the second TCI state.

5. The method of claim 4, wherein the first RS is a channel state information RS, wherein the first RS is received during a first symbol, the method further comprising:
   receiving, from the first TRP, control information during the first symbol; and
   demodulating the control information using the first RS.

6. The method of claim 3, further comprising:
   transmitting a first reference signal (RS) to the first TRP according to the first TCI state; and
   transmitting a second RS to the second TRP according to the second TCI state.

7. The method of claim 1, further comprising performing uplink transmissions to the first TRP and to the second TRP according to the high speed mode of operation.

8. A processor configured to perform operations comprising:
   determining that three conditions for entering a high speed travel mode of operation are met, wherein the three conditions are:

a user equipment device (UE) is moving rapidly between a first transmission and reception point (TRP) and a second TRP;
a repetition scheme is not configured for the UE by radio resource control (RRC); and
either 1 or 3 code division multiplexing groups is indicated for the UE in an antenna ports field; and
in response to the determination, entering the high speed travel mode of operation.

9. The processor of claim 8, wherein the high speed mode of operation comprises a single downlink control information (DCI), multi-TRP mode.

10. The processor of claim 8, wherein, according to the high speed mode of operation a transmission configuration indication (TCI) codepoint is configured, wherein the TCI codepoint indicates a first TCI state and a second TCI state.

11. The processor of claim 10, the operations further comprising:
receiving a first reference signal (RS) from the first TRP according to the first TCI state; and
receiving a second RS from the second TRP according to the second TCI state.

12. The processor of claim 11, wherein the first RS is a channel state information RS, wherein the first RS is received during a first symbol, the operations further comprising:
receiving, from the first TRP, control information during the first symbol; and
demodulating the control information using the first RS.

13. The processor of claim 10, the operations further comprising:
transmitting a first reference signal (RS) to the first TRP according to the first TCI state; and
transmitting a second RS to the second TRP according to the second TCI state.

14. The processor of claim 8, the operations further comprising performing uplink transmissions to the first TRP and to the second TRP according to the high speed mode of operation.

15. A method, comprising:
at a cellular network:
establishing communication with a user equipment device (UE);
determining that three conditions for entering a high speed travel mode of operation with respect to the UE are met, wherein the three conditions are:
the UE is moving rapidly between a first transmission and reception point (TRP) and a second TRP;
a repetition scheme is not configured for the UE by radio resource control (RRC); and
either 1 or 3 code division multiplexing groups is indicated for the UE in an antenna ports field; and
in response to the determination, entering the high speed travel mode of operation with respect to the UE.

16. The method of claim 15, wherein the high speed travel mode of operation comprises:
causing the first TRP to transmit, to the UE, first demodulation reference signals (DMRS) on first time/frequency resources, wherein the first time/frequency resources are within a first slot, wherein the first DMRS is UE-specific; and
causing the second TRP to transmit, to the UE, second DMRS on second time/frequency resources, wherein the second time/frequency resources are within the first slot and are different from the first time/frequency resources, wherein the second DMRS is UE-specific;
causing the first TRP to transmit, to the UE, first data to be demodulated using the first DMRS; and
causing the second TRP to transmit, to the UE, second data to be demodulated using the second DMRS, wherein the second data is a copy of the first data.

17. The method of claim 16, wherein the first time/frequency resources are time/frequency resources associated with DMRS transmitted to second UEs that are not determined to be moving rapidly.

18. The method of claim 17, further comprising:
causing at least one of the first TRP or the second TRP to transmit, to the UE, an indication of the second time/frequency resources.

19. The method of claim 18, wherein the indication comprises an indication of an offset of the second time/frequency resources relative to the first time/frequency resources.

20. The method of claim 16, wherein the method further comprises:
splitting the time/frequency resources associated with DMRS transmitted to the second UEs that are not determined to be moving rapidly, wherein the second time/frequency resources and the first time/frequency resources are separate subsets of the time/frequency resources associated with DMRS transmitted to UEs that are not determined to be moving rapidly.

21. The method of claim 16, wherein the first time/frequency resources are associated with a first code division multiplexing (CDM) group and the second time/frequency resources are associated with a second CDM group.

* * * * *